March 2, 1971 — F. KERZE, JR — 3,567,192
VESSEL PACKING ARTICLE
Filed June 13, 1968

INVENTOR.
Frank Kerze, Jr.
BY
ATTORNEY.

United States Patent Office 3,567,192
Patented Mar. 2, 1971

3,567,192
VESSEL PACKING ARTICLE
Frank Kerze, Jr., Bethesda, Md., assignor to the United States of America as represented by the United States Atomic Energy Commission
Filed June 13, 1968, Ser. No. 736,723
Int. Cl. B01f 3/04
U.S. Cl. 261—94                                    4 Claims

ABSTRACT OF THE DISCLOSURE

An article of manufacture for use as vessel packing in heat and mass transfer applications.

BACKGROUND OF THE INVENTION

Field of invention

This invention relates to the field of mass and heat transfer and more particularly to the field of mass and heat transfer contacting devices of the vessel packing type. This invention finds particular use in two applications as follows: First, in the production of fuel shapes for atomic reactors of the settled bed or moving bed type. Second, for the production of packing for mass transfer operations requiring for unusually corrosive conditions the use of precious metals which are difficult to fabricate.

Description of the prior art

Mass and heat transfer operations are involved in a variety of important industrial processes. One application concerns fractional distillation in which liquids of different volatilities are vaporized and separated by means of a packed column in which the rising vapors contact the descending condensate or reflux liquid. This counter-current contacting is also present in the well-established gas-absorption or liquid-stripping operations. Another application concerns the field of liquid-liquid extraction in which droplets of the lower-density immiscible liquid ascend through a higher density liquid in a column which may be provided with packing or plates to improve its efficiency. Still another application concerns the passing of a coolant fluid through a bed of heat-liberating fissionable material as in a nuclear reactor.

The efficiency of heat or mass transfer operations depends to a large extent on the size and shape of the packing used. Considering, for example, a uniform size of packing, the shape should possess various characteristics as follows: (a) the surface area to volume ratio should be fairly high to aid in the removal of heat or to minimize the amount of packing material per unit volume of its containment vessel. (b) The packing should be in point or line contact, rather than planar, to maintain a maximum free surface which is particularly essential in heat transfer where hot spots are often deleterious to corrosion resistance. (c) To minimize channeling a packing should be capable either of orderly (regular) or truly random array. The packing of this invention belongs to the latter class. One of the criteria of randomness relates to the susceptibility of a packing design to stacking in preferred positions or configurations. In contrast to some types of packing the proposed type strongly favors random orientation. (d) The packing should be capable of complete drainage of liquid as is usually desired upon process shoutdown. This characteristic minimizes stagnant regions which interfere with heat transfer or mass transfer operations. (e) The packing should resist excessive deformation under stacking conditions in a column as in the case where a noble metal is required and the desirability of a low inventory calls for thin walls. (f) The packing must resist corrosion which for some media requires materials which are not readily amenable to fabrication into tubular shapes. (g) Finally, the packing should be capable of being fabricated by economic processes.

As a datum for the comparison of similarities and differences I refer to the Raschig ring which constitutes one of the most widely used forms of packing. The Raschig ring is essentially a short cylinder having a length about equal to its diameter. The Raschig ring possessess many of the desired characteristics discussed earlier.

However, the Raschig ring is deficient in several respects and herein lies the motivation for an alternate design. The greatest deficiency lies in the fact that the cylindrical shape is relatively difficult to attain in contrast to the sheet material required for my proposed packing. Indeed, for certain high temperature metals the production of cylindrical shapes is both difficult and costly. Another deficiency lies in the fact that although Raschig rings are usually used in random array their basic geometry permits vertical or horizontal tubular sequences, neither of which is desirable. In contrast the proposed invention is not readily amenable to oriented stacking. Still another concerns the low resistance to collapse of very thin cylindrical shapes under diametral pressure, a condition ameliorated by my proposed invention. For a given thickness of material the rigidity can be increased by the use of smaller-sized shapes. This would be less desirable due to interference with flow in the case of systems which create deposits or systems which present interfacial phase separation problems which are usually aggravated by small bubble size.

One potential application of the proposed invention is for the fuel of a nuclear reactor using metallic fuel. This type of fuel is generally provided with a corrosion resistant cladding which prevents spread of fission product contamination throughout the primary coolant system. Clad elements of the proposed design could be made by several well-known metallurgical techniques. It has been noted, however, that some fuel alloys are quite resistant to corrosion by their coolants. For example, highly enriched uranium-zirconium alloy is quite resistant to pressurized water at elevated temperatures. Accordingly, the concept of using bare fuel has received periodic consideration in the nuclear field. Several years ago this concept was under study in England. More recently Oak Ridge National Laboratory proposed the study of a sodium-cooled unclad metal-fueled fast breeder reactor concept.

Another application involves the purification by fractionation of corrosive chemicals particularly where unusual purity specifications must be met. The halogens and halogen compounds are particularly severe in this regard. It is to be noted, for example, that molybdenum is a preferred material in the deBoer-van Arkel metal production process which involves iodine as a metal carrier. Note also that molybdenum sheet is must easier to make than are tubes. This applies also the metals tungsten and tantalum. The proposed packing would also be of interest in titanium tetrachloride purification or the pressure distillation separation of zirconium-hafnium tetrachlorides.

In some applications the noble metals would be the preferred materials of construction and here a low metal inventory is desired. This is attainable through the use of very thin packing. It is to be noted, for example, that platinum stills are marketed for certain applications.

My invention is directed toward a geometric article that does not suffer the disadvantages of the prior art shapes; i.e., it is rigid in all directions yet is hollow and has a surface to volume ratio equal to that of a hollow cylinder. My invention is also easily fabricated from flat sheets and attains the virtues of alternate designs

3 without the disadvantage of complicated operations such as extrusion.

Therefore an object of my invention is a hollow geometric body of high surface to volume ratio.

Another object of my invention is a hollow geometric body of high surface area to volume ratio that is rigid in all directions and is not easily crushed.

Another object of my invention is a hollow geometric body for use in column packing that provides random flow with low pressure drop while reducing channeling of the fluid.

Another object of my invention is a hollow geometric body that is adaptable for use as a fuel member in an atomic reactor.

Another object of my invention is a hollow geometric body for use in an atomic reactor that can be fabricated of sheet material without extrusion.

SUMMARY OF THE INVENTION

An article of manufacture for use as vessel packing in heat transfer or mass transfer applications which attains to a high degree the desired characteristics of such packing despite a simplicity of manufacture not available in the prior art. The article comprises a hollow geometric body which can best be visualized as a cylinder of length about equal to its height, split on a diameter, one half being rotated around the axial midpoint about 90° relative to the other half and joined at or near the four points of contact.

DESCRIPTION OF THE PREFERRED EMBODIMENT

Figure 1:
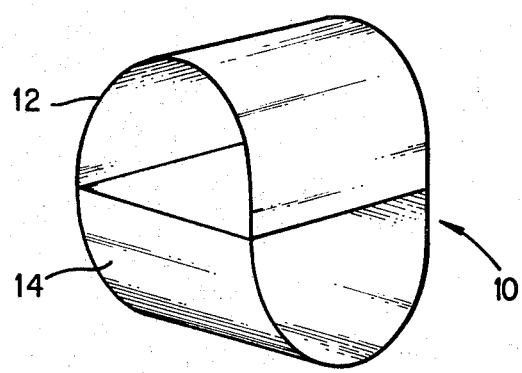
FIG. 1 is an isometric view of the preferred embodiment of my invention.

In FIG. 1 element 10 is made up of a first thin-walled semi-cylindrical member 12 and a second thin-walled semi-cylindrical member 14. Each semi-cylindrical member has an inner concave side and an outer convex side. First and second members 12 and 14 are arranged with their respective inner concave sides facing each other and positioned so that their longitudinal axes are at about 90° with respect to each other. First and second members 12 and 14 are joined at their points of contact. In FIG. 1 the cylindrical diameters and lengths of both members are all equal resulting in the points of contact being the respective corners of each member.

Figure 2:
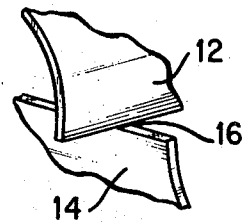
FIG. 2 is a partial view of a portion of the element showing a joint formed by the two halves of the element.

In FIG. 2 one intersection between first and second members 12 and 14 are shown. In this embodiment the respective lengths of each thin-walled semi-cylindrical member are greater than the respective cylindrical diameters of the members. This results in the right-angled overlapping 16 of the thin-walls shown in FIG. 2. It is to be noted that the parts of FIGS. 1 and 2 are joined by conventional means such as brazing or welding for metals or by adhesives for plastics.

Figure 3:
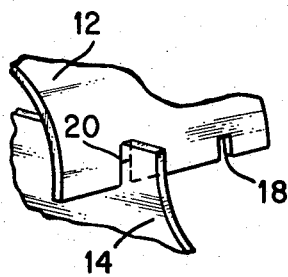
FIGS. 3 and 4 are other partial views showing joints formed by the two halves of the element.

In FIG. 3 the thin wall of each member has a small notch 18 cut therein opposite the point of intersection of the opposite mating wall so as to form a notched joint 20. It is to be noted that notching permits mechanical interlocking which may be adequate attachment for certain metals or plastics which possess resiliency or "spring-back." It is to be further noted that the interlocking force can be increased by cutting the notches at a slight angle toward the semi-cylinder end.

Figure 4:
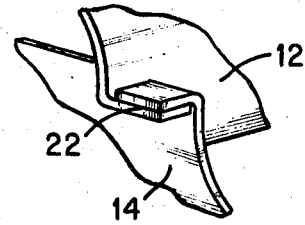

In FIG. 4 the outermost ends of the thin walls beyond the notches of each member are bent mutually 90° to overlap the adjacent thin-wall end to form an overlapped notched joint 22.

The joints of FIGS. 3 and 4 can be further strengthened by welding, etc., if desired.

4

The arrangement of surfaces 12 and 14 at 90° to each other provides a solid support wall in a diametral direction. This arrangement provides more resistance to the crushing forces, exerted on the curved surfaces, than in conventional thin-wall cylindrical articles. Therefore, a thinner wall can be used to give crushing resistance equal to thin-wall cylinders, and to provide more surface area per unit mass. Additionally, the same thickness wall as in thin-wall cylinders can be used to give the same surface area per unit mass, but more crushing resistance. Obviously a combination of the two can be used to obtain whichever advantage is desired.

The arrangement of surfaces 12 and 14 provides a hollow interior which maintains a low pressure drop for fluid flow. Regarding internal flow within the packing it is to be noted that the proposed invention provides opportunity for lateral flow in two directions in contrast to the Raschig ring in which the flow is limited to linear.

Certain processes requiring column packing are conducted under harsh environmental conditions such as in strong acids, strong alkalis, high temperatures, or a combination thereof. These conditions often require metal packing. Many metals which are useful for these requirements are not amenable to easy extrusion into rods or cylinders. In my invention the starting material is flat sheet stock. The first operation involves the production of rectangular shapes with sides approximating the dimensions D and $\pi D/2$.

Notching can be provided by gang cutting with a thin cutting disc, etc. Thin, resilient materials can be readily joined through the use of simple jigs or fixtures. In contrast, thick nonresilient materials may require preforming to the approximate semi-cylindrical shape.

In atomic reactors, heat released from the radioactive decay of nuclear material is transferred by fluid coolants to energy conversion devices such as turbines and the like. The fabricated fuel articles must provide large heat transfer surface area, resistance to deformation and are usually coated on the surfaces and edges with other metals to prevent fuel corrosion, erosion, etc. Surfaces 12 and 14 can be fabricated from laminates of nuclear fuel and protective metals to provide a fuel article of large surface area with a resistance to deformation. Moreover such laminates would undergo only nominal forming steps such as mild bending, etc., which allows retention of laminated bond integrity.

It will be evident to those skilled in the art that the parts and materials described herein as the best embodiments may be modified and changed without escaping the teachings of my invention. Therefore, my invention should not be limited by the embodiments in the specification but should be interpreted in light of the appended claims.

I claim:
1. An element, comprising:
 (a) a first thin walled semi-cylindrical member, having an inner concave side and an outer convex side; and
 (b) a second thin walled semi-cylindrical member, having an inner concave side and an outer convex side, said first and second members having open base portions and being arranged with their inner concave sides facing each other, having their respective longitudinal axes at 90° with respect to each other, and being joined at their points of contact.

2. An element as recited in claim 1 wherein said first and second members have their respective lengths greater than their respective diameters so that said first and second members have overlapping thin walls at their points of contact.

3. An element as recited in claim 2 wherein a notch is placed in each thin wall of said first and second members at their points of contact to form a notched joint.

4. An element as recited in claim 3 wherein the outermost corners of said thin walls of said first and second members are bent toward each other substantially at right angles to form overlapped notched joints.

References Cited

UNITED STATES PATENTS

| 1,725,429 | 8/1929 | Schaack, Jr. | 261—94X |
| 1,796,501 | 3/1931 | Berl | 261—94 |
| 3,151,187 | 9/1964 | Comte | 261—94 |
| 3,365,180 | 1/1968 | Lerner | 261—94 |

FOREIGN PATENTS

| 365,540 | 1/1922 | Germany | 261—94 |
| 372,928 | 7/1939 | Italy | 261—95 |

TIM R. MILES, Primary Examiner